S. NOTTINGHAM.
SPRING AXLE.
APPLICATION FILED OCT. 16, 1912.
1,067,751. Patented July 15, 1913.
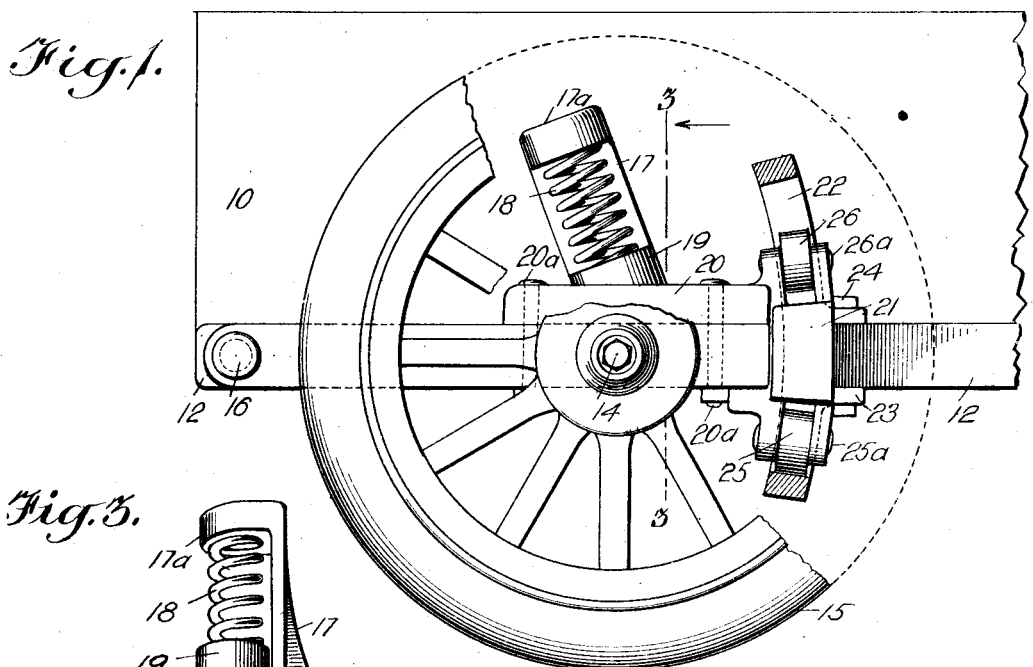
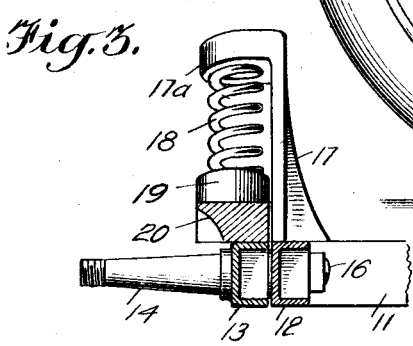
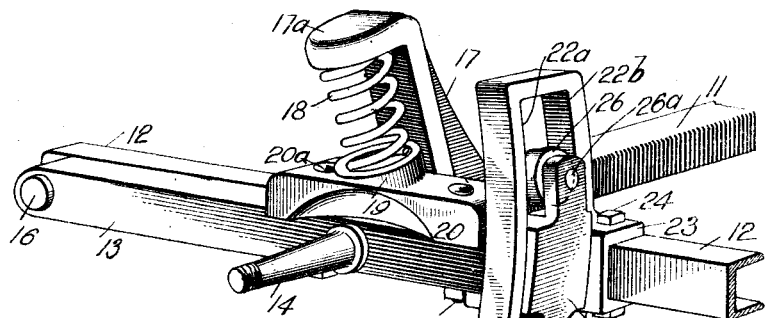
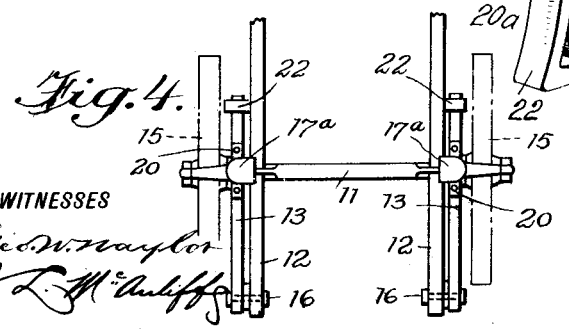
WITNESSES
INVENTOR
Starl Nottingham,
BY
ATTORNEYS

UNITED STATES PATENT OFFICE.

STARL NOTTINGHAM, OF NEW HUDSON, NEW YORK.

SPRING-AXLE.

1,067,751.  Specification of Letters Patent.  Patented July 15, 1913.

Application filed October 16, 1912. Serial No. 726,057.

*To all whom it may concern:*

Be it known that I, STARL NOTTINGHAM, a citizen of the United States, and a resident of New Hudson, in the county of Allegany and State of New York, have invented a new and Improved Spring-Axle, of which the following is a full, clear, and exact description.

My invention relates to road vehicles, and has for its design to provide an improved arrangement of spring axle and appurtenances therefor, to the end that a vehicle wheel striking an obstruction may yield and rise to pass over the obstruction.

It is a further design of my invention to provide an attachment of the character indicated, having the necessary strength to withstand the hardships of actual use, and involving a minimum cost.

It is also a design of my invention to provide an improved guiding means for the movable elements.

The invention will be more particularly explained in the specific description hereinafter to be given.

Reference is to be had to the accompanying drawings forming a part of this specification, in which similar characters of reference indicate corresponding parts in all the views.

Figure 1 is a side elevation of a portion of a wagon and wheels with parts broken out, showing my attachment applied, parts of the attachment being in section; Fig. 2 is a perspective view of the attachment; and Fig. 3 is a cross sectional view of the parts, the section being taken approximately on the line 3—3 of Fig. 1.

In constructing the example illustrated as a practical embodiment of my invention, the vehicle body 10 may be of any desired form, and have any approved fixed axle 11. At the outer ends of the axle, two parallel bars 12, 13, are provided, the bar 12 being fixedly secured in any suitable manner to the end of the axle 11, or otherwise maintained in fixed relation to the axle, while the other bar 13 carries a stub axle 14 for the wheel 15, and is pivoted by a bolt 16 or its equivalent to the rear end of the bar 12 in the rear of the axle 11.

On the axle 11, at the end, a bracket 17 is secured, having its upper end 17ª overhanging the pivoted bar 13, and a compression spring 18 abuts by its end against the lower side of the overhanging end of the bracket, the lower end of the spring being supported on a seat 19 formed on a block 20, which is secured to the pivoted bar 13, by bolts 20ª, or the like, adjacent to the stub axle 14. The arrangement is such that the bar 13 may rock vertically on its pivot with the bolt 16 as its center, to permit the wheel 15 to rise in passing over an obstruction, the spring 18 yielding sufficiently for the purpose and cushioning any shock to which the wheel may be subjected by the obstruction.

On the forward end of the pivoted bar 13 in front of the stub axle, said bar is provided with a head 21, which has guided movement in a guide loop 22 secured to the fixed bar 12, preferably by means of a shackle 23, bolts 24 passing through the said shackle and the bar 12. On the lower end of the head 21, a friction roller 25 is journaled on a pin 25ª, and at the upper end of the head a friction roller 26 is journaled on a pin 26ª, and the rollers are disposed somewhat out of vertical alinement so that the lower roller 25ª will contact with the outer interior wall surface 22ª of the guide loop, while the upper roller 26 will contact with the inner wall surface 22ᵇ on the interior of the loop. The arrangement of the rollers provides for any side lash or side play permitted between the pivoted and fixed bars, due to any lateral thrust exerted against the wheel by an obstruction, and all the swaying of the vehicle will be taken up by one or the other of the rollers, according to the direction of the side lash.

I have thus disclosed a practical means for carrying my invention into effect, and would say in conclusion that I do not limit myself strictly to the mechanical details illustrated, since manifestly the same can be considerably varied without departing from the spirit of my invention.

Having thus described my invention, I claim as new, and desire to secure by Letters Patent:—

A spring axle and appurtenances, comprising a main axle, fixed bars at right angles to the main axle outside of the ends of the latter, bars outside the fixed bars, and pivoted at one end to said fixed bars, the pivoted bars carrying stub axles, and loops shackled to the fixed bars and disposed in front of the pivoted bars at the ends opposite the pivots of the latter, the pivoted bars furthermore having heads received and guided in the loops, said heads having upper and lower friction rollers bearing respectively against opposite surfaces of each loop.

In testimony whereof I have signed my name to this specification in the presence of two subscribing witnesses.

STARL NOTTINGHAM.

Witnesses:
 JOHN REYNOLDS,
 HARNIE L. BEEBE.

Copies of this patent may be obtained for five cents each, by addressing the "Commissioner of Patents, Washington, D. C."